(12) United States Patent
Forsberg et al.

(10) Patent No.: US 7,908,954 B2
(45) Date of Patent: Mar. 22, 2011

(54) BANDSAW BLADE FOR METAL AND A METHOD FOR MANUFACTURING A BANDSAW BLADE WITH TEETH

(75) Inventors: Per Forsberg, Kenosha, WI (US); Håkan Hellbergh, Lidköping (SE); Robert C. Hayden, Sr., Cape Coral, FL (US)

(73) Assignee: Kapman AB, Sandviken (SE)

( * ) Notice: Subject to any disclaimer, the term of this patent is extended or adjusted under 35 U.S.C. 154(b) by 0 days.

(21) Appl. No.: 10/432,246

(22) PCT Filed: Nov. 22, 2001

(86) PCT No.: PCT/SE01/02580
§ 371 (c)(1),
(2), (4) Date: Oct. 15, 2003

(87) PCT Pub. No.: WO02/42029
PCT Pub. Date: May 30, 2002

(65) Prior Publication Data
US 2004/0050213 A1    Mar. 18, 2004

(30) Foreign Application Priority Data
Nov. 23, 2000   (SE) ........................... 0004305

(51) Int. Cl.
*B23D 61/12*   (2006.01)
*B23D 65/00*   (2006.01)
*B27B 33/06*   (2006.01)
*B27B 33/02*   (2006.01)

(52) U.S. Cl. ................ 83/661; 83/854; 76/112

(58) Field of Classification Search ............ 76/112, 76/50.2, 45, 27, 28, 51; 83/835–855, 788, 83/661; D15/134, 138
See application file for complete search history.

(56) References Cited

U.S. PATENT DOCUMENTS

| | | | |
|---|---|---|---|
| 1,649,864 A * | 11/1927 | Sherman | 83/852 |
| 1,906,660 A * | 5/1933 | Taylor | 83/837 |
| 2,126,382 A * | 8/1938 | Goff et al. | 83/661 |
| 2,318,549 A * | 5/1943 | Wilkie | 407/118 |
| 2,442,153 A * | 5/1948 | Van Der Pyl | 125/21 |
| 3,110,952 A * | 11/1963 | Anderson | 83/661 |
| 3,276,491 A * | 10/1966 | Dunn et al. | 83/846 |
| RE26,676 E * | 9/1969 | Anderson et al. | 76/112 |
| 3,965,781 A * | 6/1976 | Stroud et al. | 83/13 |
| 4,351,210 A * | 9/1982 | McKindary | 83/835 |
| 4,436,009 A * | 3/1984 | Ask | 83/72 |
| 5,016,497 A | 5/1991 | Sundström | |
| 5,826,465 A * | 10/1998 | Iseli | 76/112 |
| 5,848,473 A * | 12/1998 | Brandenburg, Jr. | 30/514 |
| 6,220,140 B1 * | 4/2001 | Hellebergh | 83/851 |
| 6,520,722 B2 * | 2/2003 | Hopper et al. | 407/42 |
| 7,036,415 B2 * | 5/2006 | Tsujimoto | 83/661 |
| 7,036,417 B2 * | 5/2006 | Alton | 83/846 |
| 2002/0184981 A1 * | 12/2002 | Tsujimoto | 83/13 |

FOREIGN PATENT DOCUMENTS

| | | | |
|---|---|---|---|
| DE | 3438676 | * | 1/1986 |
| DE | 197 28 932 A1 | | 1/1999 |
| EP | 0 473 364 A1 | | 8/1991 |
| GB | 821510 | | 10/1959 |

* cited by examiner

*Primary Examiner* — Laura M. Lee
(74) *Attorney, Agent, or Firm* — Buchanan Ingersoll & Rooney PC

(57) ABSTRACT

During the manufacture of a bandsaw blade, a rotary hone forms, in a clearance side of each tooth, a narrow flat land. A leading edge of the land defines a sharp cutting edge. The land has a width no longer than ten percent of the pitch distance of the teeth.

7 Claims, 1 Drawing Sheet

BANDSAW BLADE FOR METAL AND A METHOD FOR MANUFACTURING A BANDSAW BLADE WITH TEETH

BACKGROUND

In power sawing of metals with bandsaws, the cutting depth per tooth is about 10 micrometer, which is of the same order as the depth variation between teeth produced by milling or grinding the teeth in traditional ways. This means that the cutting work will basically be concentrated to a few teeth, which are then subjected to unnecessary wear, if no special procedures are used. It is then commonly recommended that the first cuts with a new sawblade are made with much less feed force than what is normally intended to be used in normal sawing. Hereby the teeth are worn to a fairly even height without risk of overloading. However, in spite of the low loading it is unavoidable that some of the cutting edges will be rounded-off so that the cutting forces increase.

It is known from other tools where all edges are parallel, such as milling cutters, that one can after mounting of the cutter in the machine rotate it against a hard abrasive hone, which at the same time makes all edges sharp and equally high, which may be pertinent when cutting inserts are replaced. On finished metal sawblades the edges are normally not parallel but set to various angles to both sides. The method of running against a hone after mounting in the bandsaw machine can thus not be used.

A problem especially encountered at bandsaws is vibrations in the plane of the sawblade, caused by sharp edges with large clearance angle being able to penetrate into the metal with so low feed force and so little difference between increasing and decreasing cutting depth, that all teeth engaged in cutting will produce vibrations with the same frequency, and since the cut bottom surface will become corrugated, they will amplify each other's vibrations. Recently mounted sawblades will cause a very annoying high frequency noise, which will be reduced when the teeth get somewhat worn, since there will then be more of a difference in feed force between increasing and decreasing cutting depth.

The present invention concerns a bandsaw blade and a method for manufacture of bandsaw blades, where all cutting edges are sharp before use, and where all edges in a group with equal lateral slope also have equal cutting depth. Such a sawblade can immediately be used for cutting with full feed and cutting speed, it will wear more slowly than a sawblade according to prior art, and it will from the beginning produce less noise.

DESCRIPTION OF THE INVENTION

Figure 1:
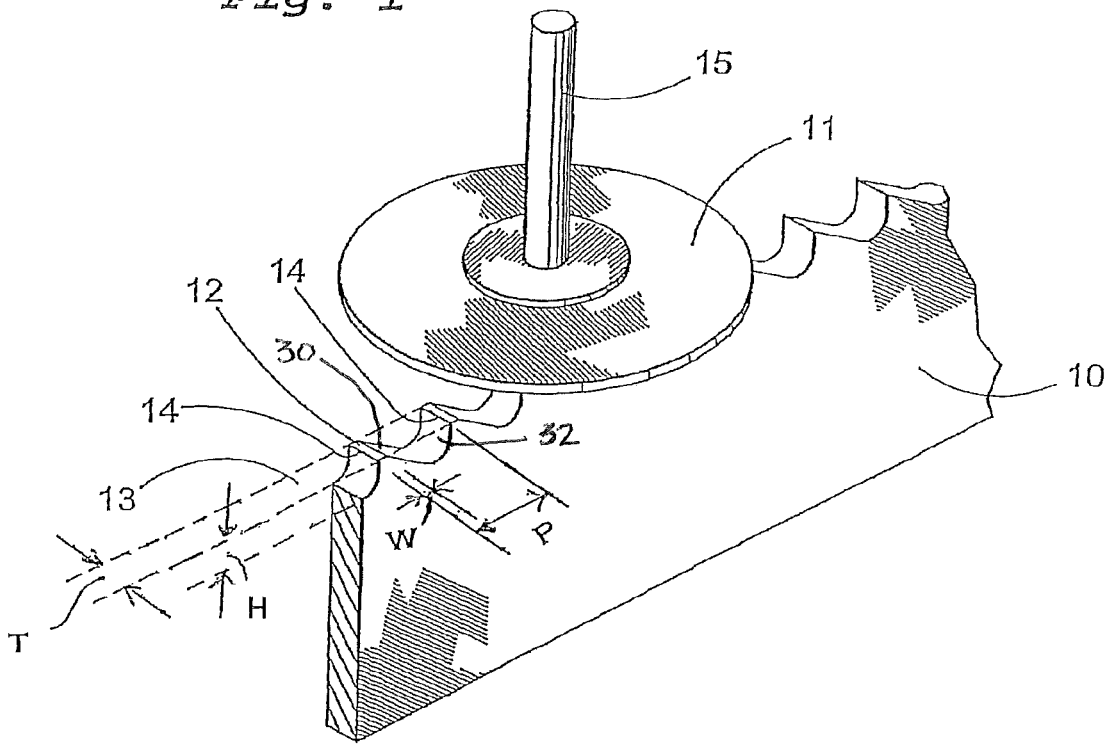
Figure 2:
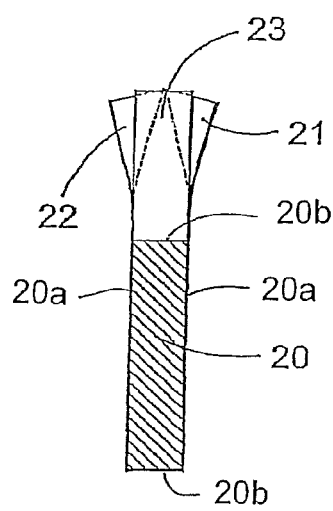

FIG. 1 shows one stage in manufacture of a bandsaw blade, after forming the profile of the teeth by milling, grinding or brazing of carbide cutting edges, but prior to setting of the teeth as required, and prior to joining the band ends to form loops. FIG. 2 shows a cross-section of the band after setting.

A bandsaw blade 20 according to the invention includes two long sides 20a, two thin edges 20b and cutting teeth, wherein all cutting teeth of the blade are disposed on one of the thin edges. The teeth may as shown in FIG. 2 be made with several groups of teeth, where the teeth in each group have equal lateral slope of the edge. Such groups can be set right 21, set left 22 or straight 23. The number of groups may also be more than three, by having two groups set right with different setting distance and angle, and correspondingly for those set left, The bandsaw blade may also be made with all teeth straight.

A backside 30 of a leading one of each pair of successive teeth extends downwardly from a respective flat land 12 in a direction which is inclined toward the trailing tooth. A front side of the trailing tooth extends downwardly from a respective cutting edge 14. Lowermost ends of the backside and front side join one another to form an upwardly open concave gullet 32 separating the two teeth.

The teeth are supposed to have basically the same height before setting, with edges 24 at right angles to the plane of the blade. Due to wear or irregularities of the tools for forming the teeth, they will originally have some variation in height, which is small compared to the height, but comparable to the cutting depth per tooth. According to the method used in grinding or milling, the tooth edges are commonly uneven or rough, and the surfaces adjoining the edge may have crosswise scratches. Such edges are liable to get further damage by chipping or similar deformation. The previously mentioned method using low feed velocity and reduced power during the first few cuts will remove the scratches and lengthen the lifetime of the edges. It has also been suggested to remove the scratches by blasting or other abrasive methods which at the same time will make the edges slightly rounded, resulting in a stable sawing but requiring increased cutting force.

At a bandsaw blade according to the invention, the scratches are removed before the final steps of manufacturing the saw blade by honing with a fine grain abrasive material against the tooth tips. By this method the teeth get very sharp cutting edges 14, narrow scratch-free lands 12 on the clearance side and equal height. This makes it possible to use full cutting force and full cutting depth from the beginning, and the lands ensure stable chip formation. The lands 12 cause a greater feed force if the cutting depth increases, and a smaller feed force if the cutting depth is reducing, compared to teeth according to prior art. The force variation will then have such a time cycle which completely prevents the teeth from amplifying the vibration of each other, and bandsaw blades made according to the invention have been shown to reduce the noise by as much as 20 decibel. The width of the lands should not exceed 10 percent of the pitch distance P between teeth, since friction on wider lands will need a greater cutting force. Also, the land width W, measured in a longitudinal direction D of the tooth, is shorter than a length L of each tooth and shorter than both a thickness T and a height H of each tooth, as is apparent from FIG. 1.

A method of manufacturing a bandsaw blade according to the invention comprises pulling the toothed blade 10 across one or more abrasive hones 11, which to avoid uneven wear of said hones are preferably made to rotate slowly. The axis of rotation 15 is preferably parallel to the plane of the saw blade but laterally offset relative to said plane. Through rubbing against the hones each tooth gets a flat land 12 on the clearance side, all said lands being in the same plane 13, and originally occurring variations in tooth height leading to variations in width of the lands 12. The leading edge of each land 12 is a cutting edge 14, which by the honing is sharper than without honing. The teeth forming each group thus is have edges and lands at equal height before setting, and will retain equal height after setting, since members of each group have equal setting angle and setting width.

By using slowly rotating hones there is an additional advantage that different points on the hone will move in different directions over the land 12, all of them having a velocity component entering the land from the edge 14, which compared to lengthwise grinding or fixed hones produces much smoother lands with less friction and especially in comparison with crosswise grinding ensures improved edge durability, since crosswise scratches may start fatigue chipping.

The material of the hone is chosen with reference to the material of the teeth, and may preferably be fine-grain diamond or boron carbide with an elastic binder. The slow rotation of the hones will occur automatically if the axis of rotation 15 is offset a distance not exceeding half the radius of the hone, if desired combined with a slight braking. It would also be possible to have a powered rotation of the hone fitted to the feed velocity of the saw blade.

Another type of hone could be one or more cylinders with large diameters and rotation axes parallel to the edge plane 13 but deviating from the length direction of the blade by an angle small enough to ensure a long enough contact time between each tooth and the hone.

The invention claimed is:

1. A bandsaw blade for the sawing of metal, the blade including two long sides and two thin edges, and cutting teeth, wherein all cutting teeth of the blade are disposed on one of the thin edges, the teeth spaced apart by a pitch distance, each tooth having a chip side and a clearance side converging to a sharp cutting edge, the clearance side monolithically formed with a flat land without clearance angle, the land extending directly from the cutting edge and having, in a longitudinal direction of the tooth, a width which is shorter than a length of each tooth and shorter than a thickness of each tooth, the width of the land not exceeding 10 percent of the pitch distance, wherein each tooth includes two sides formed by respective long sides of the blade, and further wherein at least some of the teeth are set.

2. A bandsaw blade for the sawing of metal, the blade including two long sides and two thin edges, and cutting teeth, wherein all cutting teeth of the blade are disposed on one of the thin edges, the teeth spaced apart by a pitch distance, each tooth having a chip side and a clearance side converging to a sharp cutting edge, the clearance side including a flat land without clearance angle, the land extending directly from the cutting edge and having, in a longitudinal direction of the tooth, a width which is shorter than a length of each tooth and shorter than a thickness of each tooth, the width of the land not exceeding 10 percent of the pitch distance, wherein each tooth includes two sides formed by respective long sides of the blade, wherein a backside of a leading one of each pair of successive teeth extends downwardly from the respective flat land inclinedly toward the trailing tooth of the pair, and a front side of the trailing tooth extends downwardly from the respective cutting edge, and a lowermost end of the front side joins a lowermost end of the backside to form an upwardly open concave gullet separating the leading and trailing teeth, each tooth having its flat land monolithically formed with its backside.

3. A bandsaw blade according to claim 2 wherein said lands are free of scratches and having less surface unevenness than other surfaces of the teeth.

4. A bandsaw blade according to claim 2, wherein the land width is shorter than a height of each tooth.

5. A method for manufacturing a bandsaw blade having teeth, comprising, providing a blade having two long sides and two thin edges and cutting teeth, wherein all cutting teeth of the blade are disposed on one of the thin edges, and prior to joining ends of the blade to form a loop, the step of moving the blade longitudinally while engaging the teeth with at least one rotating hone for forming on a clearance side of each tooth a flat land without clearance, wherein a leading edge of the land defines a sharp cutting edge, the land extending directly from the cutting edge and having, in a longitudinal direction of the tooth, a width which is shorter than a length of each tooth and shorter than a thickness of each tooth, the width of the land not exceeding 10 percent of the pitch distance, wherein the step of providing a blade comprises providing a blade in which each tooth includes two sides formed by respective sides of the blade, the flat land of each tooth being monolithically formed with its two sides.

6. The method according to claim 5 further including the step of setting some of the teeth following the formation of the land thereon.

7. A method according to claim 5 wherein the land width is shorter than a height of each tooth.

* * * * *